United States Patent [19]
DePuydt et al.

[11] Patent Number: 6,030,556
[45] Date of Patent: Feb. 29, 2000

[54] OPTICAL DISC STAMPERS AND METHODS/SYSTEMS FOR MANUFACTURING THE SAME

[75] Inventors: James M. DePuydt, Stillwater; Walter R. Eppler, Woodbury; Michael B. Hintz, Mahtomedhi, all of Minn.

[73] Assignee: Imation Corp., Oakdale, Minn.

[21] Appl. No.: 08/889,257

[22] Filed: Jul. 8, 1997

[51] Int. Cl.[7] .................................................. B29D 11/00
[52] U.S. Cl. ........................... 264/1.37; 216/24; 216/87; 216/99; 216/103; 264/1.33; 264/2.5; 425/810
[58] Field of Search ................................ 264/1.33, 1.36, 264/1.37, 2.5; 216/24, 87, 95, 96, 99, 100, 102, 103; 425/810

[56] References Cited

U.S. PATENT DOCUMENTS

| | | | |
|---|---|---|---|
| 4,430,659 | 2/1984 | Maffitt et al. | 346/135.1 |
| 4,470,053 | 9/1984 | Maffitt et al. | 346/135.1 |
| 4,539,572 | 9/1985 | Robbins et al. | 346/135.1 |
| 4,774,170 | 9/1988 | Pan et al. | 430/495 |
| 4,798,785 | 1/1989 | Pan et al. | 430/495 |
| 4,812,386 | 3/1989 | Pan et al. | 430/290 |
| 4,904,577 | 2/1990 | Tyan et al. | 430/495 |
| 5,051,340 | 9/1991 | Tyan et al. | 430/321 |
| 5,099,469 | 3/1992 | Dobbin et al. | 369/58 |
| 5,188,863 | 2/1993 | de Graaf et al. | 427/512 |
| 5,389,313 | 2/1995 | Imataki et al. | 264/2.5 |
| 5,458,941 | 10/1995 | Hintz | 428/64.4 |
| 5,494,782 | 2/1996 | Maenza et al. | 264/2.5 |

Primary Examiner—Mathieu D. Vargot
Attorney, Agent, or Firm—Eric D. Levinson

[57] ABSTRACT

Optical disc stampers, methods of manufacturing the optical disc stampers, systems for manufacturing the optical disc stampers, and methods of replicating optical discs using the stampers are disclosed. The optical disc stamper is formed directly on a substrate that supports a patterning material including at least one layer of a first material and at least one layer of a second material. The first and second materials can include a metal and semiconductor. The patterning material is exposed to energy in selected areas. Unexposed areas of the patterning material are then removed, resulting in an optical disc stamper. The first and second materials can form an amorphous alloy in the exposed selected areas that remains after removal of the unexposed patterning material. The optical disc stamper can be used in the replication of optical data storage discs. Also disclosed are systems for practicing the methods to produce optical data storage disc stampers.

57 Claims, 3 Drawing Sheets

OPTICAL DISC STAMPERS AND METHODS/SYSTEMS FOR MANUFACTURING THE SAME

FIELD OF THE INVENTION

The present invention relates to optical disc stampers. More particularly, the present invention provides optical disc stampers, methods of manufacturing the optical disc stampers, and methods of replicating optical discs using the stampers according to the present invention.

BACKGROUND OF THE INVENTION

Prerecorded optical discs are typically mass produced by injection molding or photopolymerization using stampers that have a negative relief pattern of the desired finished prerecorded optical disc. Conventionally, optical disc stampers are produced in a multi-step process that requires forming a master from a photoresist coated blank.

Figure 1:
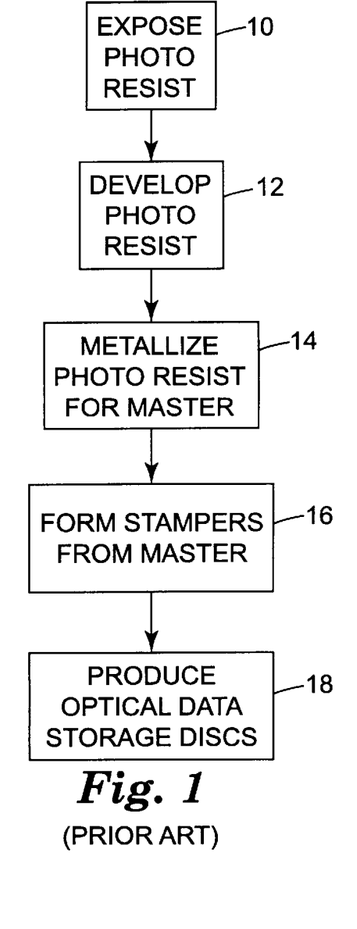
FIG. 1 is a block diagram of one conventional prior art process for forming an optical disc stamper.

Referring to FIG. 1, the steps in a conventional process for forming stampers for prerecorded optical discs are depicted. The first step 10 in the process includes forming a negative image of the desired relief pattern on a blank by exposing a layer of photoresist material such as that commonly used in the semiconductor industry.

After exposure, the second step 12 requires that the exposed photoresist material be developed to provide a relief pattern that is a negative image of the desired relief pattern. In the third step 14, a layer of metal is deposited on the developed photoresist material to produce a master having a positive image of the desired surface relief pattern of the prerecorded optical disc to be produced, i.e., the relief pattern in the master contains pits where pits are desired in the finished prerecorded optical discs. In the fourth step 16, the master is then used to form one or more optical disc stampers. The stampers are typically formed by depositing metal on the master with the resulting relief pattern in the stamper being a negative image of the relief pattern desired in the prerecorded optical disc. The fifth step 18 depicted in FIG. 1 includes producing prerecorded optical data storage discs from the stampers formed in step 16.

The conventional process depicted in FIG. 1 has a number of disadvantages. Included among the disadvantages is that the photoresist material on the blanks is typically exposed with a focused laser beam in a laser servowriter to write the data in the resist material. Because the photoresist coated blank does not include tracking and timing information, the laser servowriting process must typically be performed using air bearings and sophisticated vibration isolation equipment to ensure accurate writing of the information in the photoresist material.

The photoresist-based stamper processes described above are time-consuming and expensive. As a result, turn-around time for producing prerecorded optical discs using the conventional process is limited at least in part by the time needed to form the masters and stampers.

Adding to the disadvantage of a relatively long turn-around time to produce the stampers, the processes used to form them can also produce stampers that have errors in the relief patterns formed on them. Those errors will typically not be detected until the first optical discs formed with the stampers are tested. As a result, time and money will be spent to form stampers that must then be discarded.

Additional disadvantages of the processes described above include the need to store, expose and develop the resist-coated blanks in rooms with filtered lights because of the photosensitive nature of the resist material. A further disadvantage is that the resist-coated blanks have a shelf life and must be monitored during storage to avoid degradation of the resist coating.

Another disadvantage is that the equipment needed to expose the photoresist-coated blanks must include air bearings and sophisticated vibration isolation equipment because the tracking and timing information found on the finished optical discs is not provided on the resist-coated blanks. In many instances, the equipment required to accurately expose the resist-coated blanks and electroform the masters/stampers can cost millions of dollars.

Figure 2:
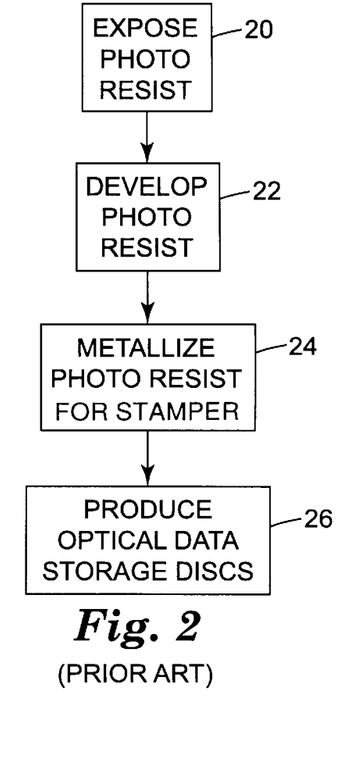
FIG. 2 is a block diagram of another conventional prior art process for forming an optical disc stamper.

An alternative process can also be used in which a stamper is formed without forming a master. One such process is depicted in FIG. 2. In that process, a photoresist-coated blank is exposed in the first step 20. After exposure, the photoresist-coated blank is then developed in a second step 22 to form a positive image of the relief pattern needed for the optical disc stampers. After developing, a third step 24 is performed in which the developed photoresist coated blank is metallized to form a stamper having a relief pattern that is a negative image of the desired relief pattern. Stampers produced directly from photoresist-coated blanks are sometimes referred to as a first generation stampers. The stamper formed in step 24 can then be used in step 26 to produce prerecorded optical data storage discs.

Although this alternate process can reduce the time required to produce a stamper because no master is formed, it suffers from all of the other problems described above. In addition, this process raises another problem in that damage to a first generation stamper produced directly from a photoresist-coated blank will require that a new photoresist blank be exposed, developed, and metallized to form a new stamper (because the developed photoresist-coated blank is destroyed in the metallization process).

Thus, there is a need for a time- and cost-efficient method for production of optical disc stampers.

SUMMARY OF THE INVENTION

The present invention eliminates the metallization steps of the conventional photoresist-based optical disc stamper forming processes to efficiently produce an optical disc stamper directly from a blank. The optical disc stamper is formed directly on a substrate that supports a patterning material. Optical discs can then be formed directly from that stamper, eliminating the need to form a master with photoresist and electroform stampers from that master.

Optical disc stampers formed according to the present invention include a substrate and a plurality of raised areas formed on the substrate. The raised areas correspond to information desired to be stored on an optical data storage disc and, in preferred embodiments, are formed from an alloy. The alloy is preferably an amorphous alloy, and, more preferably, the amorphous alloy is formed of a metal and a semiconductor. The optical disc stamper can optionally include a dielectric material between the raised areas and the substrate and/or on top of the patterning material. Furthermore, the optical disc stamper can optionally be pregrooved with tracking and timing information to eliminate the need for sophisticated tracking and timing equipment to manufacture the stampers.

Optical disc stampers of the present invention can be used to stamp or replicate a plurality of prerecorded optical data storage discs using conventional techniques. For example, optical data storage discs can be formed from the optical disc stamper using injection molding, injection-compression molding, or photopolymerization.

In one aspect, the present invention provides a method of forming an optical disc stamper including steps of providing a substrate; providing patterning material on the substrate, the patterning material comprising at least one layer of a first material and at least one layer of a second material; exposing selected areas of the patterning material to energy; and removing the patterning material outside of the selected areas, wherein the exposed patterning material forms a relief pattern on the optical disc stamper.

In another aspect, the present invention provides an optical data storage disc stamper including a substrate and a plurality of raised areas formed on the substrate, wherein the raised areas comprise an alloy of at least one metal and at least one semiconductor.

In another aspect, the present invention provides a method of forming an optical disc stamper including steps of providing a substrate; providing patterning material on the substrate, the patterning material including a plurality of layers, at least one of the plurality of layers including a metal and at least one of the plurality of layers including a semiconductor; alloying the metal and the semiconductor in selected areas on the substrate; and removing the patterning material outside of the selected areas from the substrate, wherein the alloy of the metal and the semiconductor in the selected areas forms a relief pattern on the optical disc stamper.

In another aspect, the present invention provides a method of forming an optical disc stamper including steps of providing a pregrooved substrate; providing patterning material on the substrate, the patterning material including a plurality of layers, at least one of the plurality of layers including a metal and at least one of the plurality of layers including a semiconductor; forming an amorphous alloy of the metal and the semiconductor in selected areas of the patterning material by exposing the selected areas to laser energy; and removing the patterning material outside of the selected areas from the substrate by etching with a first etchant to remove the metal and a second etchant to remove the semiconductor, wherein the etch rate of the metal and the semiconductor outside of the selected areas to the etch rate of the amorphous alloy formed in the selected areas in the first and second etchants is about 10:1 or greater, and further wherein the amorphous alloy of the metal and the semiconductor in the selected areas forms a relief pattern on the optical disc stamper.

In another aspect, the present invention provides a method of forming an optical disc stamper including steps of providing a blank having a substrate and patterning material on the substrate, the patterning material including a plurality of layers, at least one of the plurality of layers including a metal and at least one of the plurality of layers including a semiconductor; alloying the metal and the semiconductor in selected areas on the substrate; and removing the patterning material outside of the selected areas from the substrate, wherein the alloy of the metal and the semiconductor in the selected areas forms a relief pattern on the optical disc stamper.

In another aspect, the present invention provides a method of manufacturing prerecorded optical data storage discs including steps of providing an optical disc stamper having a pattern of raised areas formed on a substrate, wherein the raised areas include an alloy of at least one metal and at least one semiconductor, and replicating a plurality of prerecorded optical data storage discs directly from the optical disc stamper. This method may optionally include steps of forming the optical disc stamper by providing an optical disc stamper substrate; providing patterning material on the substrate, the patterning material including a plurality of layers, at least one of the plurality of layers including the metal and at least one of the plurality of layers including the semiconductor; alloying the metal and the semiconductor in selected areas on the substrate; and removing the patterning material outside of the selected areas from the substrate, wherein the raised areas on the substrate include the alloy of the metal and the semiconductor in the selected areas.

In another aspect, the present invention provides a system for producing optical disc stampers from optical disc stamper blanks having a substrate and patterning material on the substrate, the patterning material including a plurality of layers, at least one of the plurality of layers including a metal and at least one of the plurality of layers including a semiconductor, the system including exposure apparatus for exposing selected areas of the patterning material to energy, the exposure apparatus comprising a mechanism to move the blank relative to an energy beam and an energy source to provide the energy beam; a first etchant source; and a second etchant source; wherein the first etchant is contacted with the patterning material to remove the metal outside of the selected areas from the blank, and further wherein the second etchant is contacted with the patterning material to remove the semiconductor outside of the selected areas from the blank. The system preferably includes means for sequentially contacting the patterning material with the first and second etchants. The exposure apparatus preferably includes means for obtaining tracking and timing information directly from the optical disc stamper blank.

These and other features and advantages of the present invention will be described more fully in the detailed description of the preferred embodiments below.

DETAILED DESCRIPTION OF THE PREFERRED EMBODIMENTS

The present invention provides optical disc stampers in which a relief pattern is formed directly on the substrate of the stamper, methods of forming the optical disc stampers, and systems for practicing methods of the present invention to produce optical disc stampers according to the present invention. Because the optical disc stampers are directly written in a patterning material that subsequently forms a part of the stamper, the present invention can eliminate the need for the expensive laser beam servowriting systems and electroforming equipment required in conventional optical disc stamper formation.

Figure 3:
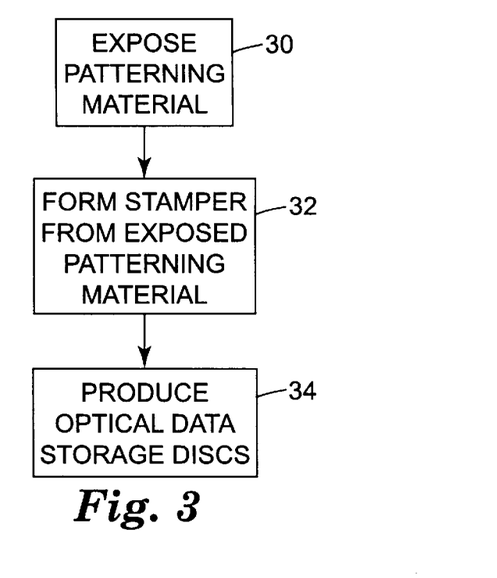
FIG. 3 is a block diagram of one process for forming an optical disc stamper according to the present invention.

One of the significant advantages of the present invention can be illustrated by comparing FIG. 3, which depicts one method of manufacturing and using optical data storage disc stampers according to the present invention, with the known methods depicted in FIGS. 1 and 2. The methods according to the present invention involve exposing patterning material on a substrate in step 30, followed by forming a stamper directly from the exposed patterning material and substrate in step 32. In other words, there is no intermediate between the step of exposing the blank 30 and the step of forming the stamper 32. The stamper formed in step 32 can be directly used to produce prerecorded optical data storage discs in step 34.

One method of manufacturing optical disc stampers according to the present invention is illustrated in FIGS. 4–7. The method begins with an optical disc stamper blank 40 including a substrate 42 on which a layer of dielectric material 44 is located. A layer of a first material 46 is located on the dielectric material 44 and a layer of a second material 48 is located on the layer of first material 46. The blank 40 also preferably includes a cap layer 50 on the layer of second material 48. The composite of layers of first and second materials 46 and 48 can be referred to as the patterning material 52 portion of the blank 40. The writing process is also depicted schematically in FIG. 4 as represented by energy beam or beams 54 selectively directed at selected areas 56 of the patterning material 52 on the blank 40.

Figure 5:
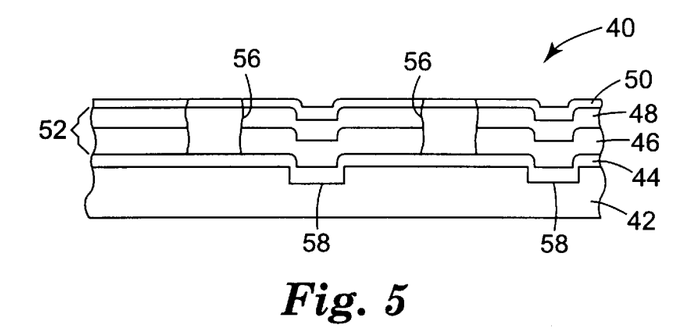
FIG. 5 is a schematic diagram of the optical disc stamper blank shown in FIG. 4 after exposure to energy in selected areas.

FIG. 5 illustrates the results of the writing process on the blank 40 in which the layers of first and second materials 46 and 48 are transformed in the selected areas 56 exposed to the energy 54 directed at the patterning material 52. The transformation should be such that the unexposed or unwritten patterning material 52 surrounding the selected areas 56 of exposed or transformed patterning material can be selectively removed as discussed below. The unexposed or unwritten patterning material 52 outside of the selected areas may be referred to below as the field material.

The patterning material 52 is preferably inorganic material that is stable under ambient lighting and environmental conditions. By using patterning material 52 that is stable under ambient conditions, filtered lighting systems are not needed for the areas in which the stampers arc manufactured. Furthermore, the use of patterning material 52 that is stable under ambient conditions provides blanks that have much improved shelf life as compared to the resist-coated blanks used in the known methods of manufacturing optical disc stampers.

Figure 4:
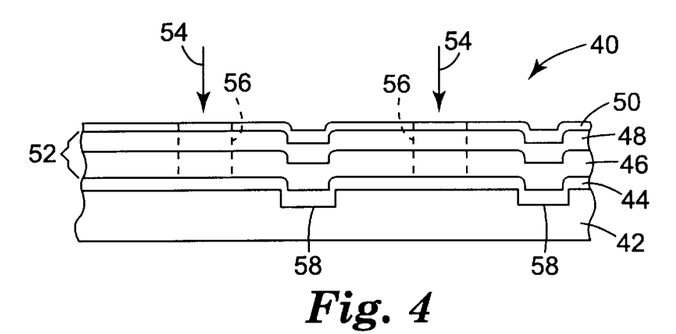
FIG. 4 is a schematic diagram of one optical disc stamper blank for use in the methods according to the present invention.

As depicted in FIGS. 4 and 5, the patterning material 52 includes at least two distinct layers 46 and 48. It is preferred that the layers 46 and 48 mix or otherwise be transformed when heated by the energy beam 54 directed at the blank 40. In order to provide sufficient data storage density, it is also preferred that the mixing or transformation in the patterning material 52 be limited substantially to those selected areas 56 in which the energy falls. In other words, the energy provided by beam 54 should not be conducted laterally outward from the selected areas 56 in sufficient amounts to cause intermixing of the first and second materials 46 and 48 to an extent that would degrade the ability of the resulting optical disc stamper to manufacture optical discs. This can alternately be referred to as "resolution" and the resolution of the system is, in some regards, limited by the intermixing that occurs in the patterning material 52 outside of the selected areas 56 in which the energy beam 54 is directly incident.

In preferred embodiments, the layers of first and second materials 46 and 48 preferably contain two different materials. In preferred embodiments, one of the first and second materials 46 and 48 is a metal and the other material is a semiconductor. A semiconductor is typically defined as a material having an electrical resistance greater than a metal, and generally in the range from $10^{-2}$ ohm-cm to $10^9$ ohm-cm. In some embodiments, the semiconductor can be selected from the group of germanium, silicon, and combinations thereof. Some particularly preferred combinations of first and second materials 46 and 48 include silicon/aluminum, germanium/aluminum, germanium/gold.

In some instances, the first and second materials may be elemental, i.e., irreducible metallic or semiconductor materials, such as elemental germanium, silicon, aluminum, or gold. Unless otherwise stated, however, the first and second materials are not limited to elemental compositions, but may consist essentially of the recited material (e.g., aluminum or germanium), or may include other constituents in addition to the recited material. For example it may be desirable when using aluminum as one the first and second materials to provide a layer of 96% aluminum/4% chromium, although the material would be referred to in connection with the present invention as "aluminum." Another example includes germanium layers that could include minor amounts of, e.g., aluminum, or other materials. The minor constituents of the layers can be provided for a number of reasons. They may be included to change the thermal conductivity of the layers and/or because they enhance deposition of the recited material while not substantially affecting its alloying properties with the materials in the other layers. In other cases, the minor constituents may be included because they enhance the alloying properties of the first and second materials. In still other cases, they may be provided because it is economically advantageous to leave minor constituents in the system (e.g., to reduce manufacturing costs) and they do not substantially affect either deposition of the recited material or its alloying properties.

The layers of first and second materials 46 and 48 of the patterning material 52 are formed using any suitable method, such as physical deposition (e.g., sputtering or evaporation) or chemical vapor deposition. For example, useful sputtering techniques include RF and DC magnetron, triode, diode, and ion-beam sputtering.

The thickness of each individual layer within the patterning material 52 is greater than one atomic layer. When conventional CD-ROM optical discs are to be produced from the stampers, the thickness of each individual layer of the first and second materials 46 and 48 can be about 10 nanometers to about 100 nanometers, more preferably about 20 nanometers to about 60 nanometers. Those skilled in the art will, however, understand that the more critical dimension is that of the resulting stack of layers forming the patterning material 52 which should roughly correspond to the desired pit depth in the optical discs to be formed using the stampers. It is however, generally preferred to provide a plurality of thinner layers within the patterning material 52 rather than, for example, two thick layers, to enhance intermixing of the materials as will be discussed further below.

The substrate 42 can be made of any suitable material having sufficient structural integrity to serve as the base of an optical disc stamper, or be capable of attachment to another stiffer base for use as a stamper. The preferred substrates 42 are preferably free from surface defects. Examples of suitable materials for the substrates 42 include metals (e.g., stainless steel, aluminum, etc.) as well as polymeric resins (e.g., polycarbonate, polymethyl methacrylate, acrylate, epoxy, etc.) or combinations thereof. The materials used for the substrate 42 should be non-reactive or generally unaffected by the processes used to develop or process the patterning material after exposure. Also, the substrate 42 can be either opaque or transparent. If the substrate 42 is transparent, the patterning material 52 may be exposed from either side of the substrate 42.

It is preferred, but not required, that the substrate 42 include grooves 58 formed therein to provide tracking and timing information that can be used to accurately expose the patterning material such that the desired relief pattern is formed on the stamper blank 40. The use of grooves 58 to provide tracking and timing information is known to those skilled in the art and will not be further described herein. Because the grooves 58 are provided before the patterning material 52 is deposited or exposed, such substrates 42 including grooves 58 will be referred to as pregrooved. By pregrooving the substrate 42, the need for an air bearing spindle and sophisticated vibration isolation during exposure of the patterning material 52 can be reduced or eliminated.

The blank 40 in FIGS. 4–7 includes an optional layer of dielectric material 44 located on the substrate 42, below the patterning material 52. The dielectric material 44 can serve a number of purposes, e.g., it may be used to provide a smooth planar surface for the succeeding layers of the patterning material 52. The dielectric material 44 may serve as an etch stop during removal of the unexposed patterning material 52 as described more completely below. The dielectric material 44 may be provided to improve the release characteristics of the finished stamper when used to replicate optical discs, i.e. the dielectric material may facilitate separation of the optical discs from the stamper 40. The dielectric material 44 may also serve as an adhesion promoter to enhance the bond between the exposed patterning material 52 and the substrate 42. The dielectric material 44 may also be provided to tune the reflectivity of the stack, i.e., patterning material 52, to obtain the desired result from exposure to the energy 54.

The dielectric material 44 can be any suitable material, but examples of some suitable materials include, but are not limited to: aluminum oxide, silicon dioxide, yttrium oxide, silicon carbide, borosilicate glass, borophosphosilicate glass, tantalum oxide, silicon nitride, chrome oxide, nickel oxide, and combinations thereof. The dielectric material 44 can be deposited by any suitable method, such as physical deposition (e.g., sputtering or evaporation) or chemical vapor deposition. The thickness of the dielectric layer 44 is preferably about 5 nanometers to about 200 nanometers, more preferably about 10 nanometers to about 50 nanometers.

FIGS. 4 and 5 also depict a cap layer 50 located on the upper surface of the patterning material 52. This cap layer 50 is provided to reduce or prevent disruptions in the planarity of the patterning material 52 during the writing process. The material or materials used for the cap layer 50 preferably maintain their integrity during writing and do not significantly mix with the underlying patterning materials 52.

Examples of some suitable materials for the cap layer 50 include dielectric materials such as aluminum oxide, silicon dioxide, yttrium oxide, silicon carbide, borosilicate glass, borophosphosilicate glass, tantalum oxide, silicon nitride, chrome oxide, nickel oxide, and combinations thereof. The cap layer 50 can be deposited by any suitable method, such as physical deposition (e.g., sputtering or evaporation) or chemical vapor deposition. The thickness of the upper layer of cap layer 50 is preferably about 5 nanometers to about 200 nanometers, more preferably about 10 nanometers to about 50 nanometers.

As shown in FIGS. 4 and 5, the patterning material 52 is exposed in selected areas 56 to energy 54 to form a pattern the patterning material 52. The patterning material 52 can be patterned using any suitable energy beam or beams 54. For example, visible, ultraviolet or infrared laser radiation, electron beams, ion beams, and combinations thereof can be used to expose the patterning material 52. The exposure, as used herein, can be to optical energy, thermal energy, kinetic energy, etc. as required to effect the desired transformation in the patterning material 52.

In one preferred embodiment, the patterning material 52 is exposed using laser energy beams 54 to selectively expose the patterning material 52 with an optimal level of resolution. Light energy 54 from a laser energy source is preferably pulsed at an appropriate power and duration to expose the patterning material 52 in the selected areas 56. The angle of incidence of the laser energy 54 on the patterning material 52 is preferably normal to provide the highest resolution to the selected areas 56 of exposed patterning material 52. The power and duration of the pulsed laser energy depends on the thickness of the patterning material 52, the composition of the patterning material 52, spot size, velocity of the blank 40, wavelength of the light, the patterning material being used, etc.

In exposed areas 56 of the patterning material 52, structural and/or chemical transformations occur during the exposure. Absorbed energy preferably causes a localized change in the physical properties of one or more layers 46 and 48 of the patterning material 52. In one embodiment, the layers 46 and 48 of the patterning material 52 mix locally in the selected areas 56 to form an alloy. The alloy in the selected areas is preferably an amorphous alloy. By amorphous alloy, we mean that the patterning material 52 in the selected areas 56 is not phase separated into the components of the layers 46 and 48 but is, instead, amorphous.

In some instances, the amorphous alloy may be a eutectic alloy. A eutectic alloy is a mixture of components wherein the solid phase transforms to the liquid phase at a temperature that is lower than the melting temperature of either component by itself. Furthermore, eutectic alloys have a eutectic point that corresponds to a particular composition of the alloy components that transforms completely to the liquid phase at a eutectic point temperature without undergoing an intermediate phase transformation (i.e., transformation of a solid mixture to a mixture of a solid mixture and a liquid mixture prior to transformation to a liquid mixture alone). As a consequence of this behavior, when eutectic alloys are formed, the first and second materials 46 and 48 of the patterning material 52 can be expected to begin localized interfacial melting at a temperature well below the melting temperature of either individual material. The molten regions, i.e., selected areas 56, may then intermix to a sufficient degree to form a eutectic alloy.

As an alternative to the formation of an alloy in the patterning material 52, the first and second materials 46 and 48 of the patterning material 52 may be amorphous as deposited and become more crystalline upon exposure to the energy 54 in selected areas 56. In yet another embodiment, at least one of the layers of the first and second materials 46 and 48 of the patterning material 52 is crystalline prior to being exposed. Upon exposure to the energy 54, each of the crystalline layers becomes amorphous.

Regardless of the exact transformation in the patterning material 52 in the selected areas 56 caused by exposure to energy 54, the end effect is that the transformed patterning material 52 in the selected areas is less susceptible to removal than unexposed patterning material 52 outside of the selected areas 56. In addition, the patterning material 52 in the selected areas 56 should exhibit physical properties that allow it to be used in the manufacturing of optical discs by injection molding, injection-compression molding, photopolymerization, etc. Thus, unlike in conventional optical disc stamper fabrication, there is no need for the expensive electroforming steps described in the background section above.

The patterning material 52 in the selected areas 56 should exhibit sufficient mechanical integrity and adhesion to the substrate 42 to directly form prerecorded optical discs by injection molding, injection-compression molding, photopolymerization, etc. The finished stamper 40 is preferably capable of forming a plurality of prerecorded optical discs with an acceptable yield rate. More preferably, the finished stamper 40 should be capable of producing at least about 50 prerecorded optical discs with the desired relief pattern, more preferably, at least about 500 prerecorded optical discs.

Unexposed patterning material 52 may be selectively removed using any suitable method that allows the transformed patterning material 52 in the selected areas 56 to remain on the substrate 42. In one example, the patterning material 52 can be contacted (e.g., by immersion in a solution or spray) with a developer solution to chemically etch away unexposed patterning material 52. The patterning material 52 is contacted with one or more developer solutions for an appropriate time duration to remove substantially all of the patterning material 52 in unexposed areas. The developer solutions will typically be selected based on the materials in the layers forming the patterning material 52. After contacting the patterning material 52 with the developer solution, it is preferable to rinse the resulting structure with a neutralizing agent, such as deionized water to remove any remaining developer solution or particles from the surface of the structure.

Where the removal process is to be accomplished by etching, it is preferred that the etch processes exhibit etch rate ratios of about 10:1 or greater, more preferably about 30:1 or greater. In other words, the etch rate of at least one layer of the unexposed patterning material 52 is preferably at least about ten times the etch rate of the transformed patterning material 52 in the selected areas 56. In terms of the preferred systems in which an amorphous alloy is formed in the selected areas 56, at least one layer of the unexposed patterning materials 52 is preferably etched at a rate of ten times or more the rate of etching of the amorphous alloy formed in the selected areas 56 that were exposed.

Where etching is used to remove the unexposed patterning material 52, it is also preferred that the etchants used be selective to removal of one component of the patterning material 52. In other words, for the patterning material 52 that includes first and second materials 46 and 48, the etching process will include two different process steps. One of the process steps will use a first etchant that selectively removes the unexposed first material 46 while the other process step will use a second etchant that selectively removes the unexposed second material 48. Both the first and second etchants, however, will preferably exhibit the selectivity required to leave the transformed patterning material 52 in the selected areas 56 on the stamper 40. Selectivity may be enhanced where the preferred amorphous alloy is formed in the selected areas 56 of the patterning material 52. An example of one etch process will be described below with reference to FIGS. 6 and 7.

Figure 6:
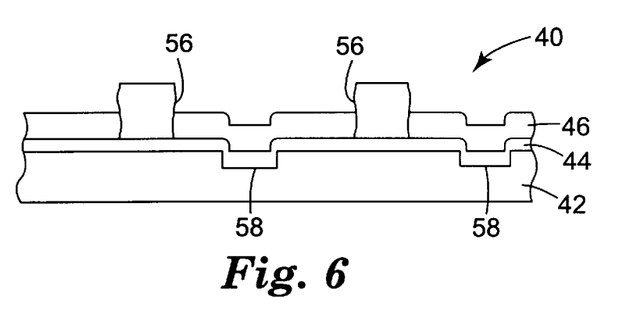
FIG. 6 is a schematic diagram of the optical disc stamper of FIG. 5 after removal of a portion of the patterning material.

In those embodiments and methods in which a cap layer 50 is provided as discussed above, it is preferred, but not required that the first etchant used to remove the unexposed first material 46 also remove the cap layer 50. Alternatively, the cap layer 50 can be removed in a separate step including either a third etchant or by any other suitable process. After the cap layer 50 is removed to expose the underlying layer of second material 48, the stamper 40 is processed to selectively remove the unexposed portions of the second material 48 as seen in FIG. 6. Those portions of the transformed patterning material 52 in the selected areas 56 are substantially unaffected by the removal of the second material 48.

Figure 7:
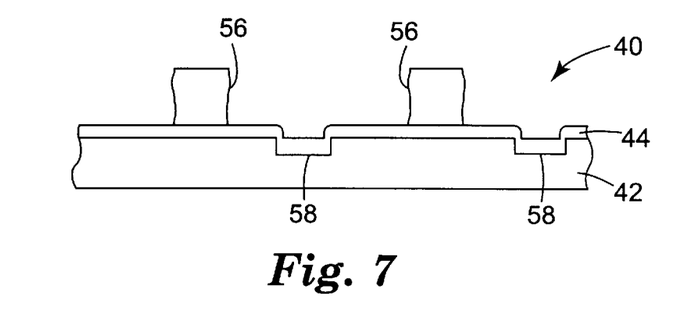
FIG. 7 is a schematic diagram of the optical disc stamper of FIG. 6 after further removal of the patterning material.

Following the removal of the second material 48, the layer of first material 46 is then processed to selectively remove the unexposed portions of the first material 46 as seen in FIG. 7. Those portions of the transformed patterning material 52 in the selected areas 56 are substantially unaffected by the removal of the first material 46. In addition, it is preferred, but not required that the underlying layer of dielectric material 44 remain intact after removal of the layer of first material 46. In other embodiments, the dielectric material 44 between the transformed patterning material 52 in the selected areas 56 may be removed with the first material 46 or in an additional process step performed after the removal of the first material 46.

The stamper 40 formed in FIG. 7 is then preferably suitable for use in replicating optical discs in processes such as, for example, injection molding, injection-compression molding, photopolymerization, etc. As shown in FIG. 7, after the unexposed patterning material 52 is removed, the substrate 42, dielectric layer 44 and selected areas 56 of exposed patterning material 52 form an optical disc stamper 40.

The height of the selected areas 56 of exposed patterning material 52 on the optical disc stamper 40 is preferably substantially the same as the thickness of the original patterning material 52 as depicted in FIGS. 4 and 5. In some instances, however, the vertical height of the selected areas 56 may be more or less than the height of the original patterning material 52.

Figure 8:
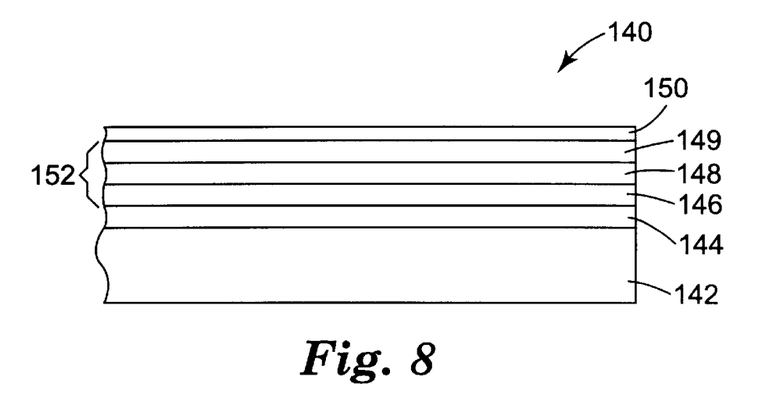
FIG. 8 is a schematic diagram of another optical disc stamper blank for use in the methods according to the present invention.

FIG. 8 schematically depicts an alternative embodiment of an optical disc stamper blank 140 that includes a substrate 142 on which an optional layer of dielectric material 144 is located. A layer of first material 146 is located on the layer of dielectric material 144 and a layer of second material 148 is located on the layer of first material 146. A layer of a third material 149 is located on the layer of second material 148 and an optional cap layer 150 is also provided in the depicted embodiment. The first, second and third materials 146, 148, and 149 together make up the patterning material 152 in the disc stamper blank 140 of FIG. 8.

It will be understood that in addition to three layers of different materials as depicted in FIG. 8, the present invention could also include patterning materials on a substrate that include four or more layers of different materials. Regardless of the number of different materials provided in the patterning material, the process of removing the unexposed patterning material will generally involve the use of process steps that selectively remove one or more of the components of the patterning material 152 while substantially not affecting the patterning material 152 in the selected areas.

For example, if three different components are used to form the patterning material as depicted in FIG. 8 and etching is the preferred method of selective removal, then preferably three different etch process steps will be performed to initially remove the unexposed third material 149, followed by removal of the unexposed second material 148, followed by removal of the unexposed first material 146. It may be that the etchant used to remove the third material 149 can also be used to remove the first material 146, but that the first material 146 will not be removed at the same time as the third material 149 because of the intervening layer of second material 148.

It may also be preferred to provide alternating layers of two or more different materials to make up the patterning material in an optical disc stamper according to the present invention. For example, in the embodiment of FIG. 8, the first material 146 could be germanium, the second material 148 could be aluminum, and the third material 149 could also be germanium, thereby forming a Ge/Al/Ge composite patterning material 152 on the stamper blank 140. In many instances, it may be desirable to provide multiple layers of at least one of the components of the patterning material 152 to promote more uniform mixing of the different materials in response to the writing process.

If an optical disc stamper blank such as that described in the above paragraph, i.e., including a patterning material 152 of Ge/Al/Ge, is used it will be understood that processing of the resulting exposed stamper 140 will typically involve selectively removing each layer 146, 148 and 149 by use of a suitable process while leaving the exposed portions on the stamper substrate 142. One example of a suitable etching process would involve subjecting the upper layer 149 to a first etchant of tartaric acid solution:hydrogen peroxide (1:1 by volume where the tartaric acid solution is mixed with deionized water at a ratio of 10 grams to 25 grams of $H_2O$) to remove the upper layer 149 of germanium, followed by a rinse in deionized water. Next a second etchant of $H_3PO_4$:$H_2O$:Glycerin (30:10:50 by volume) is used to remove the aluminum in layer 148 followed by a rinse in deionized water. Finally, the lower layer 146 of germanium could be removed with by using the first etchant a second time, followed by a final rinse in deionized water. The etchants used may be provided at an elevated temperature to enhance the process.

As described above, optical disc stampers and methods of their formation according to the present invention provide a distinct advantage over known processes involving electroforming of masters and/or stampers for the manufacturing of optical discs. The methods according to the present invention can potentially produce a finished optical disc stamper in as little as thirty minutes from a blank. The methods do not require the use of filtered light in the processing areas. If the blank is pregrooved with tracking and timing information, the methods according to the present invention can also eliminate the need for air bearings and sophisticated vibration isolation equipment in connection with the process of writing in the patterning material on the blanks.

Figure 9:
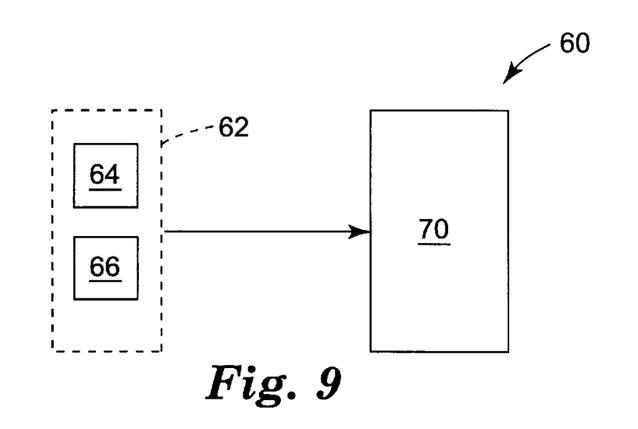
FIG. 9 is a schematic diagram of one system for producing optical disc stampers according to the present invention.

One example of system 60 useful for producing optical disc stampers according to the principles of the present invention is depicted in FIG. 9. The system 60 is depicted schematically in block-diagram format because the actual design and/or selection of the various components used in such systems will be known to those skilled in the art. The system 60 for processing blanks includes an exposure apparatus 62 in which selected areas of the master blank are exposed to the appropriate energy needed to transform the patterning material on the blank (as described above). The exposure apparatus 62 preferably includes a mechanism 64 to rotate the blank and an energy source 66 relative to each other to expose the patterning material on the blank. The energy source 66 can be any appropriate type such as a laser, etc.

The exposure apparatus 62 also preferably includes means for obtaining timing and/or tracking information from the blanks during exposure to reduce or eliminate the need for air bearings and other sophisticated equipment to ensure accurate exposure of the blanks. By including such a means, systems 60 according to the present invention can offer significant advantages over known systems for producing optical disc stampers.

The exposed blank is then transferred (manually or otherwise) to the selective removal apparatus 70 in which the exposed disc is subjected to etching or other processes designed to remove the unexposed portions of the patterning material from the exposed blank. Selective removal of the unexposed portions of the patterning material from the blanks provides the desired optical disc stampers which can then be used in appropriate replication equipment and processes.

Figure 10:
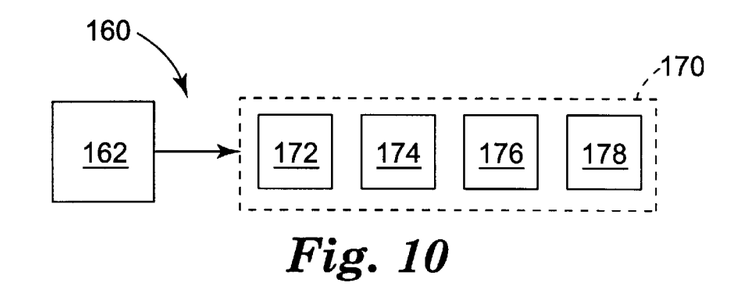
FIG. 10 is a schematic diagram of an alternative system for producing optical disc stampers according to the present invention.

FIG. 10 depicts an alternate embodiment of a system 160 including an exposure apparatus 162 and selective removal apparatus 170. If the selective removal process involves etching of the blanks, the apparatus 170 may include one station as discussed above, or it may involve a number of different stations 172, 174, 176 and 178 at which the blanks are exposed to etch solutions to selectively remove the unexposed patterning materials on the blanks with rinsing steps between etchants. For example, station 172 may include a first etchant solution for selectively removing a portion of the unexposed patterning material as described above, while station 174 is provided to rinse the etchant between process steps. Station 176 may then provide a second etchant solution for selectively removing another portion of the unexposed patterning material as described above, followed by a final rinse to remove the etchant and any other contaminants that might interfere with optical disc replication from the stampers.

In the system of FIG. 10, the stations 172 and following can each include means for sequentially contacting the patterning material with the first and second etchants. The means can include sprayers, immersion tanks, combinations thereof, and other apparatus designed to contact a surface with an etchant solution.

The following examples are illustrative of specific embodiments and/or methods according to the present invention. A wide variety of variations from the following examples are within the scope of the present invention and are only to be limited by the appended claims.

EXAMPLES

Example 1

A flat polycarbonate substrate was coated with the following layers in the order recited: 30 nanometers of germanium, 60 nanometers of aluminum, 30 nanometers of germanium, and 10 nanometers of yttrium oxide. The layers were all formed by sputtering according to known methods to produce an unexposed blank. Although referred to as aluminum, the aluminum layer was 96% aluminum and 4% chromium.

Random EFM (i.e., the digital modulation code used in compact-disc recording) encoded data was written on the unexposed blank with a laser having a wavelength of 680 nanometers that was focused through the substrate using a lens with a numerical aperture of 0.55. The marks were written at a constant velocity of 2.4 meters per second to form an exposed blank. The power used for writing the data was varied and included 10 milliwatts, 12 milliwatts, 14 milliwatts, and 15 milliwatts.

The exposed blank was then developed by immersion in selective etchants and rinsing in running deionized water between etch steps. The exposed blank was initially immersed in a first etchant of tartaric acid solution:hydrogen peroxide (1:1 by volume where the tartaric acid solution is mixed with deionized water at a ratio of 10 grams to 25 grams of $H_2O$) for 5 minutes and 45 seconds (at a temperature of about 21 degrees Centigrade), followed by a rinse in running deionized water for 3 minutes. The first etchant removed the yttrium oxide layer and the uppermost germanium layer in the areas that were not exposed to the laser energy.

After rinsing, the partially etched blank was then immersed in a second etchant solution of $H_3PO_4:H_2O$:Glycerin (30:10:50 by volume) for ten minutes to remove the aluminum layer in the areas that were not exposed to the laser energy. The second etchant bath was also maintained at 38 degrees Centigrade. The partially etched blank was then rinsed in running deionized water for 3 minutes to remove the second etchant.

After the second rinse, the partially etched blank was then immersed again in the first etchant for 2 minutes and 30 seconds to remove the germanium layer next to the substrate in the areas that were not exposed to laser energy. This etch step was followed by a third rinse in running deionized water for 3 minutes.

The third etch step completed removal of the unexposed patterning material on the substrate, leaving the amorphous alloy of germanium/aluminum on the substrate in bumps that formed a relief pattern.

Example 2

A flat polycarbonate substrate was coated with the following layers in the order recited: 20 nanometers of germanium, 30 nanometers of aluminum, 20 nanometers of germanium, 30 nanometers of aluminum, 20 nanometers of Germanium, and 20 nanometers of yttrium oxide. The layers were all formed by sputtering according to known methods to produce an unexposed blank. As in Example 1, the aluminum layers were 96% aluminum and 4% chromium.

Random EFM (i.e., the digital modulation code used in compact-disc recording) encoded data was written on the unexposed blank with a laser having a wavelength of 680 nanometers that was focused through the substrate using a lens with a numerical aperture of 0.55. The marks were written at a constant velocity of 2.4 meters per second to form an exposed blank. The power used for writing the data was varied and included 10 milliwatts, 12 milliwatts, and 14 milliwatts.

The exposed blank was then developed by immersion in the first and second etchants, and rinsing in running deionized water between etchants as in Example 1. The protocol followed was immersion in the first etchant for 5 minutes, rinse, immersion in the second etchant for 13 minutes, rinse, immersion in the first etchant for 2.5 minutes, rinse, immersion in the second etchant for 6 minutes, rinse, immersion in the first etchant for 3 minutes, and a final rinse.

These etch steps removed the unexposed patterning material on the substrate, leaving the amorphous alloy of germanium/aluminum on the substrate in bumps that formed a relief pattern.

Example 3

A flat opaque substrate was coated with patterning material including the following layers in the order recited: 15 nanometers of germanium, 30 nanometers of aluminum, 15 nanometers of germanium and 20 nanometers of yttrium oxide. The layers were all formed by sputtering according to known methods to produce an unexposed blank. As in Example 1, the aluminum layer was 96% aluminum and 4% chromium.

Random EFM (i.e., the digital modulation code used in compact-disc recording) encoded data was written in the patterning material with a laser having a wavelength of 780 nanometers that was focused on the substrate using a lens with a numerical aperture of 0.55. The marks were written at a constant velocity of 1.2 meters per second to form an exposed blank. The power used for writing the data was varied and included 8 milliwatts, 10 milliwatts, 12 milliwatts, and 14 milliwatts.

The exposed blank was then developed by immersion in the first and second etchants, and rinsing in running deionized water between etchants as in Example 1. The protocol followed was immersion in the first etchant for 5 minutes, rinse, immersion in the second etchant for 6 minutes, rinse, immersion in the first etchant for 5 minutes, and a final rinse.

These etch steps removed the unexposed patterning material on the substrate, leaving the amorphous alloy of germanium/aluminum on the substrate in bumps that formed a relief pattern. The stamper was then placed in an injection-compression molder and used to form CD-ROM discs.

All patents, patent applications, and publications disclosed herein are incorporated by reference in their entirety, as if individually incorporated. The foregoing detailed description and examples have been given for clarity of understanding only. No unnecessary limitations are to be understood therefrom. The invention is not limited to the details shown and described, for variations obvious to one skilled in the art will be included within the invention defined by the claims.

What is claimed is:

1. A method of forming an optical disc stamper comprising steps of:
    providing a substrate;
    providing patterning material on the substrate, the patterning material comprising at least one layer of a first material and at least one layer of a second material;
    exposing selected areas of the patterning material to energy wherein the exposing selected areas of the patterning material to energy forms an alloy of the first and second materials in the selected areas; and
    removing the patterning material outside of the selected areas, wherein the exposed patterning material forms a relief pattern on the optical disc stamper.

2. The method of claim 1, wherein the patterning material covers substantially all of a first surface of the substrate.

3. The method of claim 1, wherein at least one of the first and second materials is a metal.

4. The method of claim 1, wherein the first material is a metal and the second material is a semiconductor.

5. The method of claim 4, wherein the metal and the semiconductor are elemental.

6. The method of claim 1, wherein the first material is selected from the group of gold, aluminum, and combinations thereof, and further wherein the second material is selected from the group of silicon, germanium, and combinations thereof.

7. The method of claim 1, wherein the alloy is an amorphous alloy.

8. The method of claim 1, wherein the step of providing a substrate comprises providing a pregrooved substrate.

9. The method of claim 1, wherein the step of removing comprises etching.

10. The method of claim 9, wherein the etching comprises providing a first etchant to selectively remove the first material and a second etchant to selectively remove the second material.

11. The method of claim 10, wherein the first and second etchants are provided sequentially.

12. A method of forming an optical disc stamper comprising steps of:
   providing a substrate;
   providing patterning material on the substrate, the patterning material comprising a plurality of layers, at least one of the plurality of layers comprising a metal and at least one of the plurality of layers comprising a semiconductor;
   alloying the metal and the semiconductor in selected areas on the substrate; and
   removing the patterning material outside of the selected areas from the substrate, wherein the alloy of the metal and the semiconductor in the selected areas forms a relief pattern on the optical disc stamper.

13. The method of claim 12, wherein the patterning material covers substantially all of a first surface of the substrate.

14. The method of claim 12, wherein the step of alloying comprises forming an amorphous alloy.

15. The method of claim 12, wherein the step of alloying comprises exposing the selected areas of the patterning material to laser energy.

16. The method of claim 12, wherein the step of providing a substrate comprises providing a pregrooved substrate.

17. The method of claim 12, further comprising providing a layer of dielectric material on the substrate between the patterning material and the substrate.

18. The method of claim 12, further comprising providing a cap layer on the patterning material, wherein the cap layer comprises a dielectric material.

19. The method of claim 12, wherein the step of removing comprises etching.

20. The method of claim 19, wherein the etch rate of the metal and the semiconductor outside of the selected areas to the etch rate of the alloy formed in the selected areas is about 10:1 or greater.

21. The method of claim 19, wherein the etch rate of the metal and the semiconductor outside of the selected areas to the etch rate of the alloy formed in the selected areas is about 30:1 or greater.

22. The method of claim 19, wherein the etching further comprises providing a first etchant to remove the metal and a second etchant to remove the semiconductor.

23. The method of claim 22, wherein the first and second etchants are provided sequentially.

24. The method of claim 23, wherein the metal is selected from the group of gold, aluminum, and combinations thereof, the semiconductor is selected from the group of silicon, germanium, and combinations thereof, the first etchant comprises tartaric acid and hydrogen peroxide, and the second etchant comprises phosphoric acid and glycerin.

25. A method of forming an optical disc stamper comprising steps of:
   providing a pregrooved substrate;
   providing patterning material on the substrate, the patterning material comprising a plurality of layers, at least one of the plurality of layers comprising a metal and at least one of the plurality of layers comprising a semiconductor;
   forming an amorphous alloy of the metal and the semiconductor in selected areas of the patterning material by exposing the selected areas to laser energy; and
   removing the patterning material outside of the selected areas from the substrate by etching with a first etchant to remove the metal and a second etchant to remove the semiconductor, wherein the etch rate of the metal and the semiconductor outside of the selected areas to the etch rate of the amorphous alloy formed in the selected areas in the first and second etchants is about 10:1 or greater, and further wherein the amorphous alloy of the metal and the semiconductor in the selected areas forms a relief pattern on the optical disc stamper.

26. The method of claim 25 further comprising providing a cap layer on the patterning material, wherein the cap layer comprises a dielectric material.

27. The method of claim 26, wherein the cap layer is removed by at least one of the first and second etchants.

28. The method of claim 25, wherein the first and second etchants are provided sequentially.

29. The method of claim 25, wherein the metal is selected from the group of gold, aluminum, and combinations thereof, the semiconductor is selected from the group of silicon, germanium, and combinations thereof, the first etchant comprises tartaric acid and hydrogen peroxide, and the second etchant comprises phosphoric acid and glycerin.

30. A method of forming an optical disc stamper comprising steps of:
   providing a blank comprising a substrate and patterning material on the substrate, the patterning material comprising a plurality of layers, at least one of the plurality of layers comprising a metal and at least one of the plurality of layers comprising a semiconductor;
   alloying the metal and the semiconductor in selected areas on the substrate; and
   removing the patterning material outside of the selected areas from the substrate, wherein the alloy of the metal and the semiconductor in the selected areas forms a relief pattern on the optical disc stamper.

31. The method of claim 30, wherein the step of alloying comprises forming an amorphous alloy.

32. The method of claim 31, wherein the step of alloying comprises exposing the selected areas of the patterning material to laser energy.

33. The method of claim 30, wherein the substrate comprises a pregrooved substrate.

34. The method of claim 30, wherein the blank comprises a cap layer on the patterning material, wherein the cap layer comprises a dielectric material.

35. The method of claim 30, wherein the step of removing comprises etching.

36. The method of claim 35, wherein the etch rate of the metal and the semiconductor outside of the selected areas to the etch rate of the alloy formed in the selected areas is about 10:1 or greater.

37. The method of claim 35, wherein the etching further comprises providing a first etchant to remove the metal and a second etchant to remove the semiconductor.

38. A method of forming an optical disc stamper comprising steps of:
   providing a substrate;
   providing patterning material on the substrate, the patterning material comprising at least one layer of a first material and at least one layer of a second material;
   providing a cap layer on the patterning material;
   exposing selected areas of the patterning material to energy wherein the exposing selected areas of the patterning material to energy forms an alloy of the first and second materials in the selected areas; and
   removing the patterning material outside of the selected areas, wherein the exposed patterning material forms a relief pattern on the optical disc stamper.

39. The method of claim 38, wherein the cap layer comprises a dielectric material.

40. The method of claim 38, wherein the patterning material covers substantially all of a first surface of the substrate.

41. The method of claim 38, wherein at least one of the first and second materials is a metal.

42. The method of claim 38, wherein the first material is a metal and the second material is a semiconductor.

43. The method of claim 42, wherein the metal and the semiconductor are elemental.

44. The method of claim 38, wherein the first material is selected from the group of gold, aluminum, and combinations thereof, and further wherein the second material is selected from the group of silicon, germanium, and combinations thereof.

45. The method of claim 38, wherein the alloy is an amorphous alloy.

46. The method of claim 38, wherein the step of providing a substrate comprises providing a pregrooved substrate.

47. The method of claim 38, further comprising a layer of dielectric material on the substrate between the patterning material and the substrate.

48. The method of claim 38, wherein the step of removing comprises etching.

49. The method of claim 48, wherein the etching comprises providing a first etchant to selectively remove the first material and a second etchant to selectively remove the second material.

50. The method of claim 49, wherein the first and second etchants are provided sequentially.

51. A method of forming an optical disc stamper comprising steps of:
   providing a substrate;
   providing patterning material on the substrate, the patterning material comprising at least one layer of a first material and at least one layer of a second material;
   providing a layer of dielectric material on the substrate between the patterning material and the substrate;
   exposing selected areas of the patterning material to energy wherein the exposing selected areas of the patterning material to energy forms an alloy of the first and second materials in the selected areas; and
   removing the patterning material outside of the selected areas, wherein the exposed patterning material forms a relief pattern on the optical disc stamper.

52. The method of claim 51, wherein the patterning material covers substantially all of a first surface of the substrate.

53. The method of claim 51, wherein at least one of the first and second materials is a metal.

54. The method of claim 51, wherein the first material is a metal and the second material is a semiconductor.

55. The method of claim 54, wherein the metal and the semiconductor are elemental.

56. The method of claim 51, wherein the first material is selected from the group of gold, aluminum, and combinations thereof, and further wherein the second material is selected from the group of silicon, germanium, and combinations thereof.

57. The method of claim 51, wherein the alloy is an amorphous alloy.

* * * * *